United States Patent [19]
Haan

[11] 3,713,503
[45] Jan. 30, 1973

[54] VEHICLE GENERATOR SYSTEM
[76] Inventor: Harold U. Haan, Parkersburg, Iowa 50665
[22] Filed: March 1, 1971
[21] Appl. No.: 119,743

[52] U.S. Cl. .................. 180/65 R, 290/44, 290/55
[51] Int. Cl. ........................ H02j 7/14, H02j 7/32
[58] Field of Search ... 180/65, 60, 1 R, 54 R; 290/55, 290/54, 43, 44; 244/58

[56] References Cited

UNITED STATES PATENTS

| 3,374,849 | 3/1968 | Redman | 180/65 R |
|---|---|---|---|
| 1,717,552 | 6/1929 | Dunn | 244/58 X |
| 3,621,930 | 11/1971 | Dutchak | 180/65 R |
| 1,709,684 | 4/1929 | Possin | 244/58 |
| 3,444,946 | 5/1969 | Waterbury | 180/65 R |

FOREIGN PATENTS OR APPLICATIONS 877,563  9/1942  France ........................ 180/1 R Primary Examiner—Kenneth H. Betts
Assistant Examiner—Milton L. Smith
Attorney—Zarley, McKee & Thomte

[57] ABSTRACT

An electrically powered vehicle having fan-driven generators or alternators selectively individually engageable by the driver such that as the speed of the vehicle increases and the air reaching the fan increases, additional generators may be powered. A wedge cam is adapted to move between rows of staggered generators to progressively move them into engagement with opposite belt portions of a continuous belt. Two belts are provided for doubling the number of generators.

6 Claims, 5 Drawing Figures

PATENTED JAN 30 1973  3,713,503
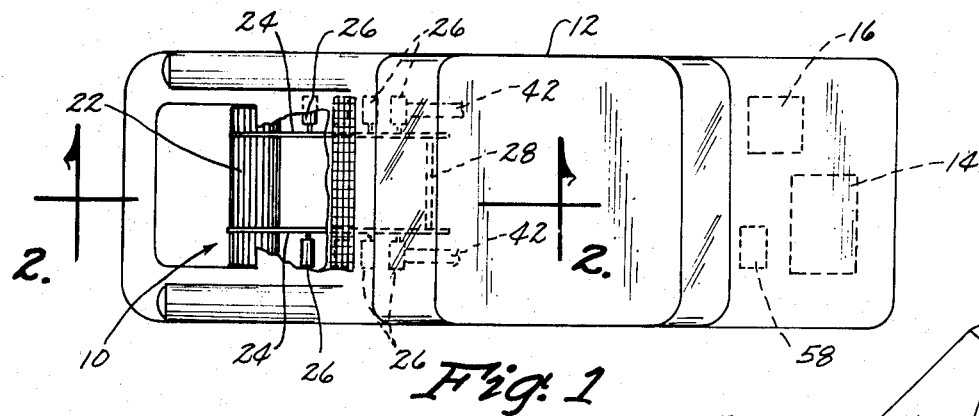
Fig. 1
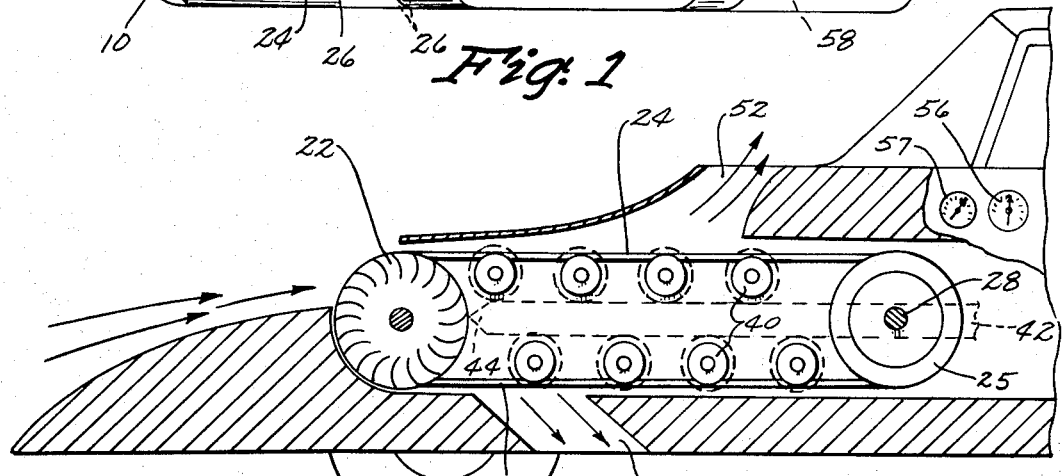
Fig. 2
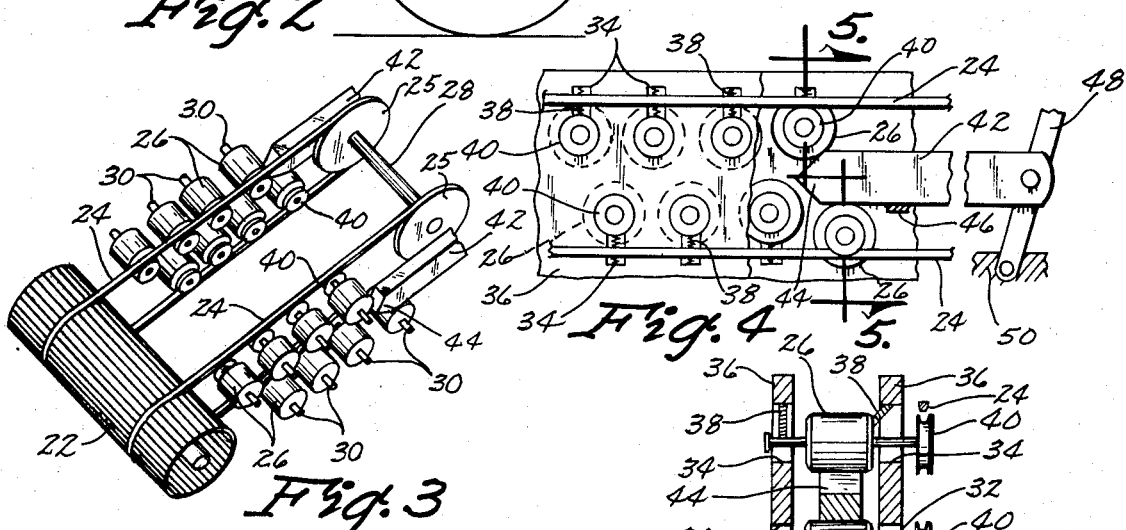
Fig. 3
Fig. 4
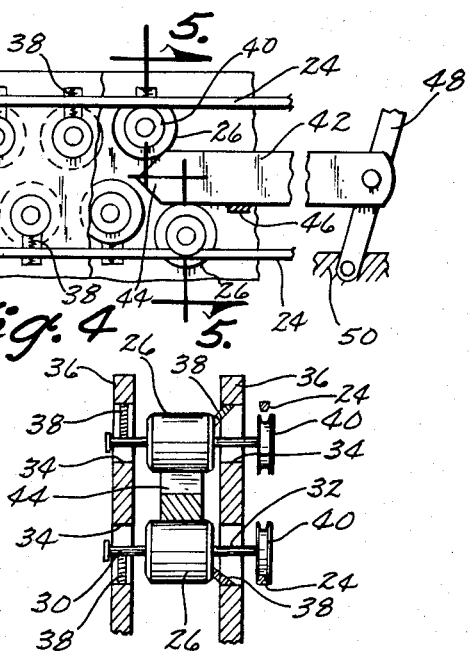
Fig. 5
INVENTOR
HAROLD U. HAAN
BY
Zarley, McKee & Thomte
ATTORNEYS

VEHICLE GENERATOR SYSTEM

The electrically powered vehicle is practical only if the electrical power source can be recharged conveniently. A vehicle will displace a certain amount of air as it moves forwardly and it is the object of this invention to utilize this displaced air by driving a fan coupled by a belt to a plurality of generators which may be progressively and selectively engaged. The faster the vehicle moves the faster the fan will turn and accordingly more power will be available for driving additional generators. At low speeds none or only a few generators will be operated by the fan.

An ammeter may be provided to give the driver an indication of the current usage and charging characteristics at various times during the operation of the vehicle. A suitable voltage regulator may also be utilized.

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a fragmentary top plan view of a vehicle utilizing the vehicle generator system of this invention;

FIG. 2 is a cross sectional view taken along line 2 — 2 in FIG. 1;

FIG. 3 is a perspective view of the fan driving the generators;

FIG. 4 is a cross section view of the cam element engaging the generators;

FIG. 5 is a cross sectional view taken along line 5 — 5 in FIG. 4;

The vehicle generator system of this invention is referred to generally in FIG. 1 by reference numeral 10 and is shown on a vehicle 12 powered by a motor 14 connected to a battery power source 16.

The vehicle 12 includes a front end cross current fan 22. The cross current fan 22 includes two rearwardly extending belts 24 engaging idler pulleys 25 on a shaft 28. Eight generators 26 in staggered relationship are in engagement, four each, with the top and bottom opposite belt portions of each belt 24. As seen in FIG. 5, the generators 26 have oppositely extending shafts 30 and 32 received in vertically elongated slots 34 in support frame members 36. Springs 38 bias the stationary shafts 30 and the generator housing laterally away from the plane of the belt portions such that the pulleys 40 on the ends of the shafts 32 will not be rotated until positively moved into engagement by a cam actuating element 42. The horizontally disposed actuating element 42 has a pointed forward end 44 such that as it moves between the upper and lower rows of generators 26 it will progressively move them into an operative position with the pulleys 40 engaging the belt portions 24. A guide and support member 46 is provided for the cam member 42 and a lever 48 is pivoted to the car body 50 and to the cam member 42 and is exposed in the driver compartment of the vehicle 12 such that the driver may selectively engage and disengage the generators 26 as desired. Thus the driver's compartment would have two actuating levers 48, one for each of the two sets of eight generators driven by the two belts 24.

The air passing into the cross current fan 22 is discharged at the top and bottom of the vehicle through discharge ports 52 and 54, respectively, as indicated by the air current arrows in FIG. 2.

The electrical circuitry for the generator system includes an ammeter 56 in the driver's compartment in a circuit with a voltage regulator 58 in turn connected to the battery 16 and the motor 14. The generators would be connected in parallel to this circuit. The ammeter would perform its usual function of indicating to the driver the amount of charge being supplied to the battery and the voltage regulator would limit the voltage and current to safe levels and also prevent discharge back to the generators when not in use.

It is seen in use that the vehicle will displace a certain amount of air as it moves forwardly and that this air is utilized to recharge the power battery by the fan being rotated and driving the generators connected to the battery. No additional power is required for the vehicle due to the addition of these generators and fan since the air resistance will remain the same. The fan will obviously turn very slowly at slow speeds and much faster at fast speeds thus making the driver's responsibility that of selectively engaging additional generators as the speed increases. This is accomplished by actuating the levers 48 which will successively move additional generators into operative engagement with the drive belt 24 connected to the fan 22. The actuating of the generators could be automatically controlled by correlating their operation with the speed of the fan such that at given speeds a certain number of generators would be powered and as the speed varied either way the number of generators being operated would be accordingly varied. Utilizing the generator system of this invention the original charge placed on a battery 16 can be substantially extended before a new independent charge will be required. Thus, through the use of this invention, the electric powered car will be practical and feasible.

A velocity meter 57 may be utilized to indicate speeds at which generator should be operated.

The scope of this invention may include use of circuits for increasing or decreasing voltages.

I claim:

1. A vehicle having a rechargeable electrical power source, comprising,
    a plurality of electrical generators operatively connected to said rechargeable electrical power source,
    a fan at the front of said vehicle in a passageway opening to the front such that as said vehicle moves forwardly air will pass through said passageway causing said fan to rotate,
    drive means for selectively interconnecting said fan with said generators,
    actuating means for selectively moving each of said generators successively into driving engagement with said drive means whereby the output power of said fan may be correlated to the air input power, and
    said drive means including a continuous belt engaging a pulley on said fan and selectively engaging pulleys on said generators, said drive means including an idler pulley opposite said fan and the opposite belt lengths are adapted to selectively engage said generator pulleys positioned between said idler pulley and said fan.

2. The structure of claim 1 wherein said actuating means includes a cam member adapted to move between first and second rows of generators to move them outwardly for engagement with said opposite belt lengths.

3. The structure of claim 1, wherein said generators are staggered such that as said cam member is moved progressively between said rows of generators said generators will progressively be moved into engagement with said belt lengths.

4. The structure of claim 3 wherein springs are provided for biasing said generators out of engagement with said belt lengths against the opposing action of said cam member.

5. The structure of claim 4 wherein said actuating means further includes a lever connected to said cam member and accessible in the driver's compartment of said vehicle.

6. The structure of claim 5 wherein a second belt is coupled to said idler pulley and plurality of generators are arranged to selectively engage opposite belt portions in response to actuation of a cam element operated by a lever extending into said driver's compartment.

* * * * *